(12) United States Patent
Wang

(10) Patent No.: US 6,615,752 B1
(45) Date of Patent: Sep. 9, 2003

(54) SOWING SHOVEL FOR SOWING SEED

(76) Inventor: Ching-Long Wang, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/164,253

(22) Filed: Jun. 7, 2002

(51) Int. Cl.[7] ................................................. A01C 5/02
(52) U.S. Cl. ............................................... 111/95; 294/51
(58) Field of Search ............................... 111/92, 95, 96, 111/97; 172/371, 373, 374; 294/50.8, 50.9, 51, 55

(56) References Cited

U.S. PATENT DOCUMENTS

| | | | | |
|---|---|---|---|---|
| 74,231 A | * | 2/1868 | Lawson ........................ 111/95 |
| 2,737,318 A | * | 3/1956 | Molinare ..................... 222/191 |
| 2,808,013 A | * | 10/1957 | Dean ............................. 111/7.1 |
| 3,202,120 A | * | 8/1965 | Laffler ........................... 111/96 |
| 4,084,726 A | * | 4/1978 | Nicol ............................ 221/266 |
| 4,123,980 A | * | 11/1978 | Winston ........................ 111/92 |
| 4,461,225 A | * | 7/1984 | Patrick ........................... 111/95 |
| 5,170,729 A | * | 12/1992 | Benner .......................... 111/7.2 |
| 5,615,744 A | * | 4/1997 | Krafka ........................... 172/22 |
| 5,870,961 A | * | 2/1999 | Morin ........................... 111/95 |
| 6,186,082 B1 | * | 2/2001 | Drobek ......................... 111/92 |
| 6,502,720 B2 | * | 1/2003 | Schwederski ............... 221/268 |

FOREIGN PATENT DOCUMENTS

JP   8-289616   * 5/1996

* cited by examiner

*Primary Examiner*—Victor Batson

(57) ABSTRACT

A sowing shovel for sowing seed gradually as the sowing shovel is used. The sowing shovel has a body, an adjusting rod at a bottom of the body, a plate for adjusting the adjusting rod to move reciprocally. The body has a concave shovel portion and a handle. The plate drives the adjusting rod to move forwards and backwards between a handle and a concave shovel portion so that some seeds are placed in the concave shovel portion of the sowing shovel in advance. When the plate is moved to drive the adjusting rod to move backwards, a space is formed for receiving falling seeds. When the user digs soil, seeds can be placed in the soil. Thus the sowing shovel can be operated easily and conveniently only by one hand.

2 Claims, 4 Drawing Sheets

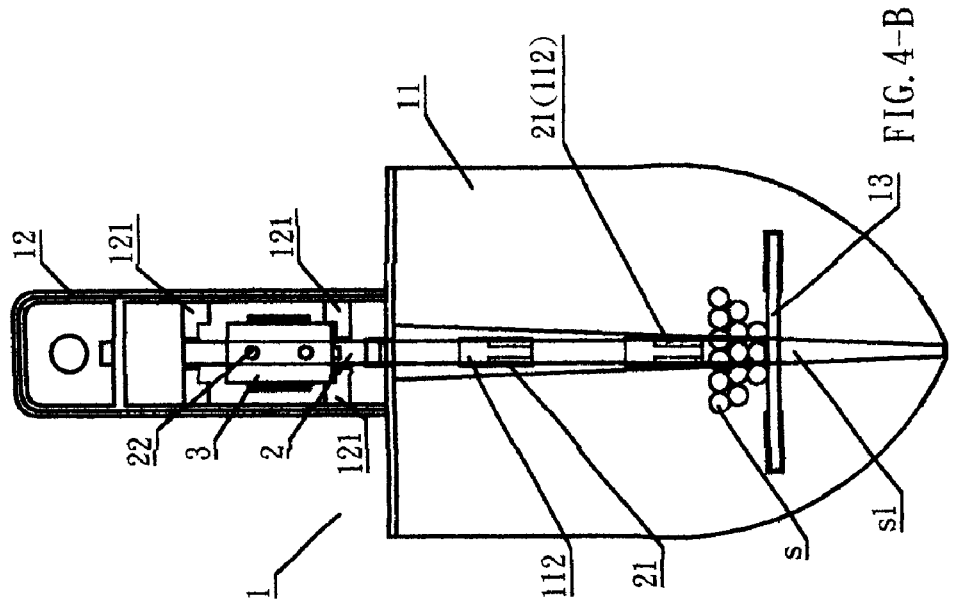
FIG. 4-A
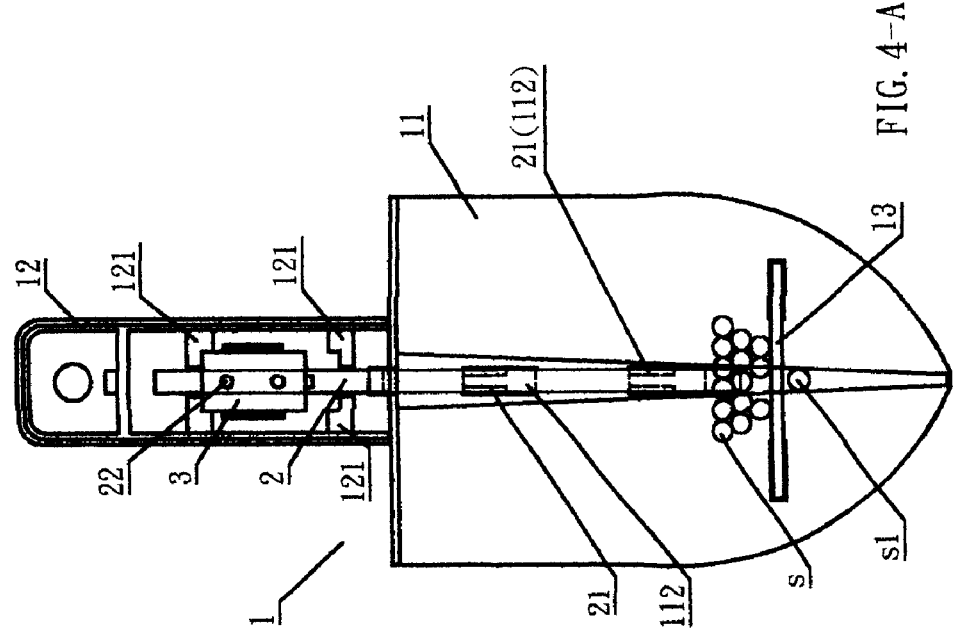
FIG. 4-B

SOWING SHOVEL FOR SOWING SEED

The handle is hollowed. An interior of the handle has a stopping rib for confining the movement of the plate. The connection of the handle and the concave shovel portion has a penetrating hole for being inserted by the adjusting rod. An upper side of the penetrating hole has a buckling groove. After the adjusting rod and the plate are placed therein. An upper cover is located upon the buckling groove. The upper cover has a via hole at a position with respect to the stopping rib.

The adjusting rod passes through the penetrating hole at the connection of the concave shovel portion and the handle. A portion at a lower end of the adjusting rod corresponding to the track has a series of resisting blocks. An area of each buckling block is slightly smaller than the track so that the buckling block moves reciprocally in the track.

The plate is located to an upper side of the adjusting rod. A top surface of the plate slightly protrudes from a top of the via hole of the upper cover. An area of the plate is smaller than the via hole and is capable of moving reciprocally in the via hole.

The plate drives the adjusting rod to move forwards and backwards between the handle and the concave shovel portion so that some seeds are placed in the concave shovel portion of the sowing shovel in advance. Then the sowing shovel is placed in the earth so that a hole is formed in soil. Then the plate is moved to drive the adjusting rod to move backwards so that a space is formed between a bottom of the concave shovel portion and the pass hole of the stop portion for receiving falling seeds.

The various objects and advantages of the present invention will be more readily understood from the following detailed description when read in conjunction with the appended drawing.

BRIEF DESCRIPTION OF THE DRAWINGS

FIG. 4A is a plane view of the present invention before sowing.

FIG. 4B is a plane view after sowing.

DETAILED DESCRIPTION OF THE PREFERRED EMBODIMENTS

The structure, features, effect and objects will be described hereinafter with the appended drawings.

Figure 1:
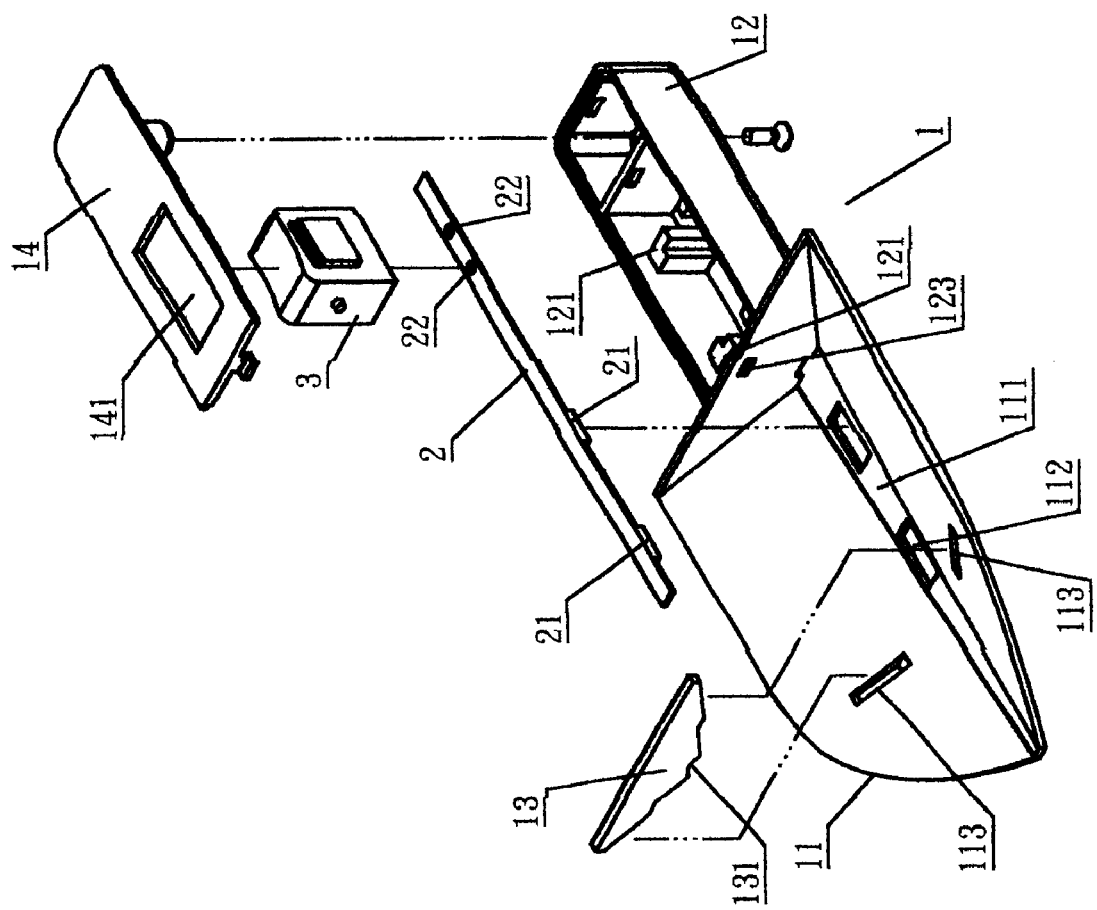
FIG. 1 is an exploded perspective view of the present invention.
Figure 2:
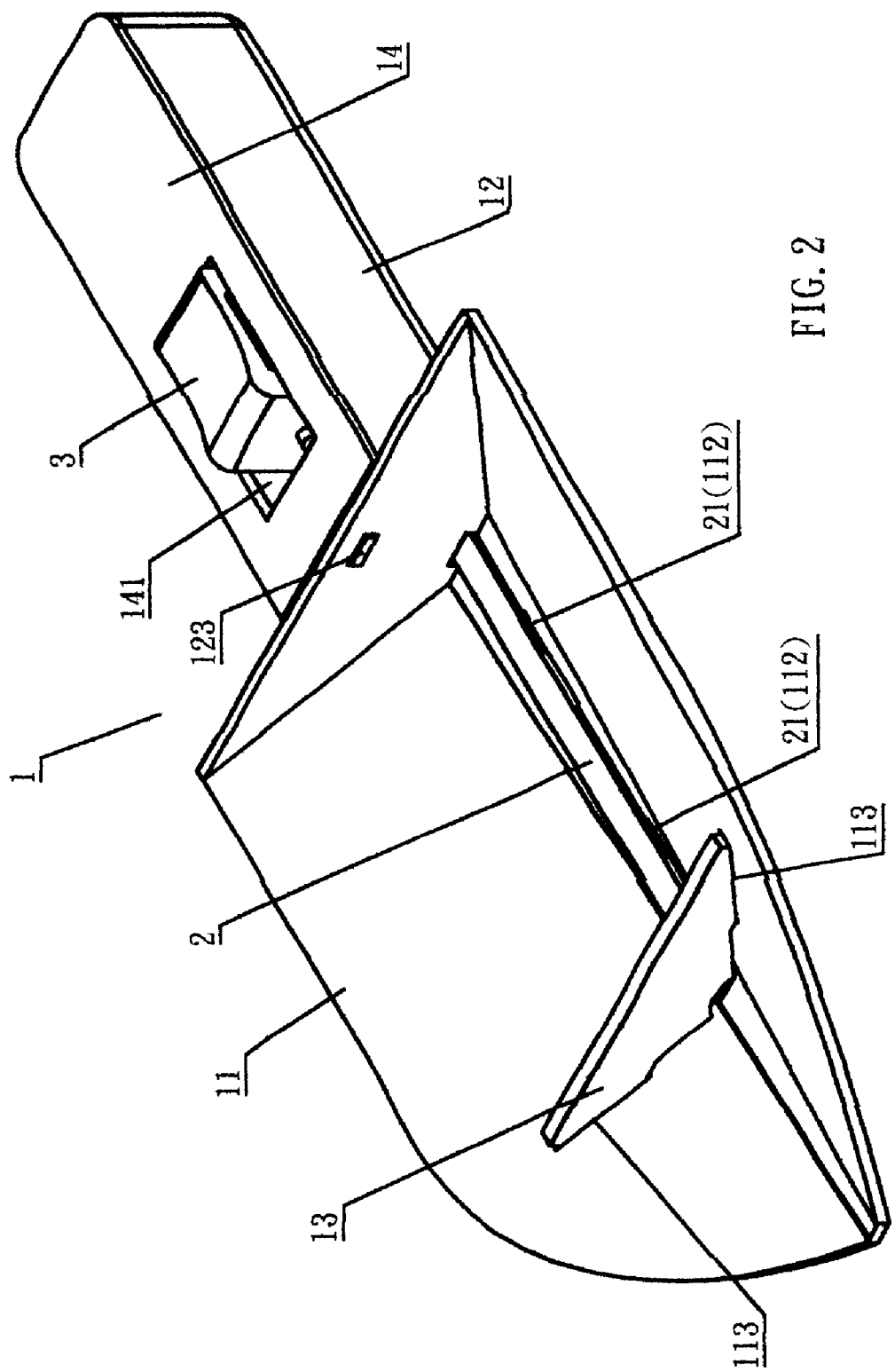
FIG. 2 is an assembled perspective view of the present invention.
Figure 3:
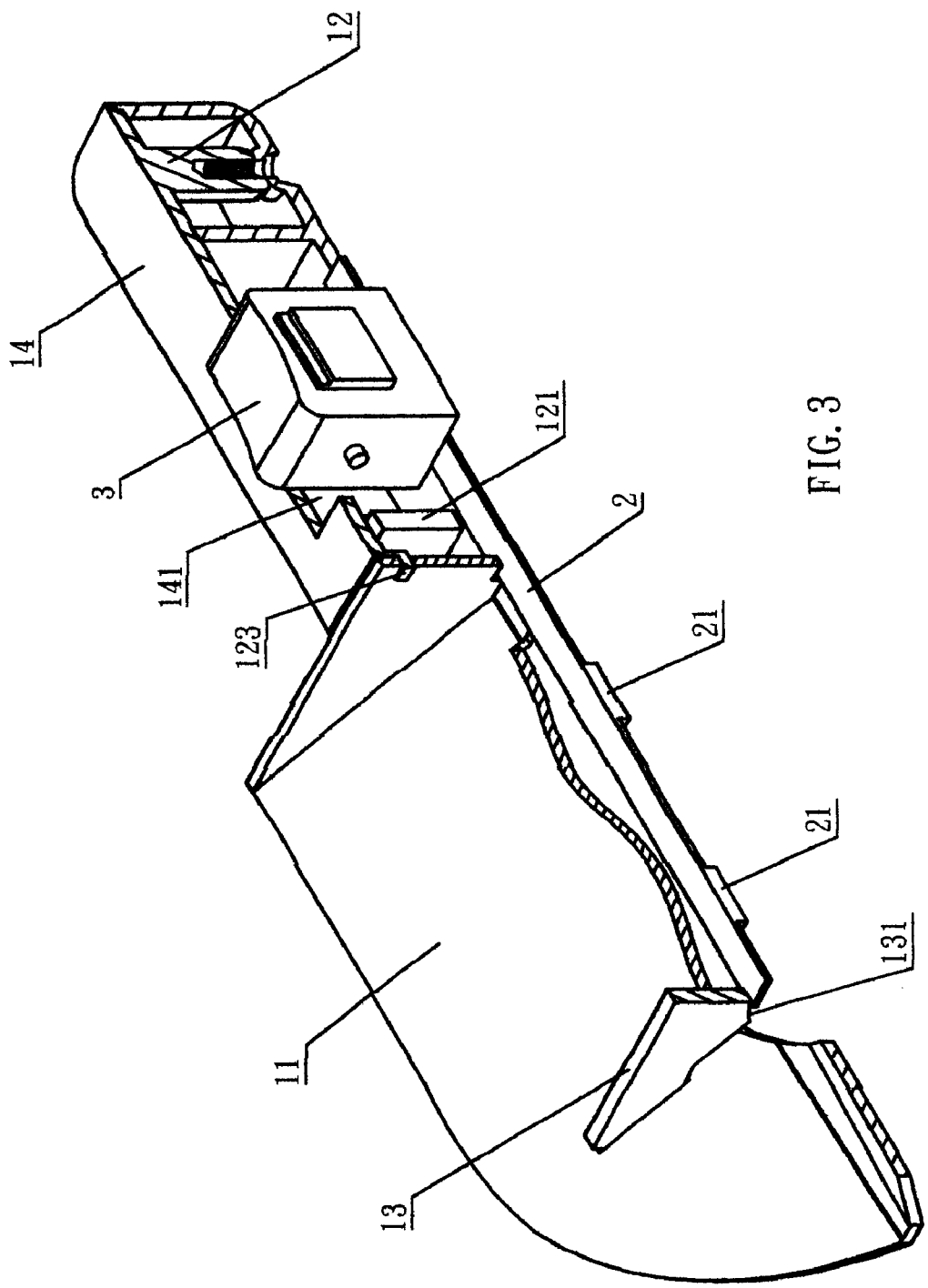
FIG. 3 is a cross sectional view of the present invention.

Referring to FIGS. 1 to 3, the sowing shovel has a body 1, an adjusting rod 2 at the bottom of the body 1, and a plate 3 for adjusting the adjusting rod 2 to move reciprocally.

The body 1 has a concave shovel portion 11 at the front section and a handle 12 at the rear section. The two sides of the concave shovel portion 11 are inclined upwards. A center thereof is formed with a slender horizontal portion 111. The horizontal portion 111 is formed with a track 112. Two sides of the concave shovel portion 11 are installed with embedding holes 113 for confining the stop portion 13 across the two sides of the concave shovel portion 11. A bottom of the sowing shovel has a pass hole 131 for receiving falling seeds.

The handle 12 is hollowed. The interior of the handle 12 has a stopping rib 121 for confining the movement of the plate 3. The connection of the handle 12 and the concave shovel portion 11 have a penetrating hole for being inserted by the adjusting rod 2. The upper side of the penetrating hole has a buckling groove 123. After the adjusting rod 2 and the plate 3 are placed therein, an upper cover 14 can be located upon the buckling groove 123. The upper cover 14 has a via hole 141 at a position with respect to the stopping rib 121.

The adjusting rod 2 passes through the penetrating hole at the connection of the concave shovel portion 11 and the handle 12. A portion at a lower end of the adjusting rod 2 corresponding to the track 112 has a series of resisting blocks 21. The area of each buckling block 21 is slightly smaller than the track 112 so that the buckling block 21 may move reciprocally in the track 112. A distal end of the adjusting rod 2 has a positioning hole 22. The positioning hole 22 is exactly locked to the plate 3.

The plate 3 is located to the upper side of the adjusting rod 2. A top surface of the plate 3 slightly protrudes from the top of the via hole 141 of the upper cover 14. The area of the plate 3 is smaller than the via hole 141 and can move reciprocally in the via hole 141.

The operation of the present invention is illustrated in FIG. 4. The plate 3 may drive the adjusting rod 2 to move forwards and backwards between the handle 12 and the concave shovel portion 11 so that some seeds can be placed in the concave shovel portion 11 of the sowing shovel in advance. Then the sowing shovel is placed in the earth so that a hole is formed in soil. Then the plate 3 is moved to drive the adjusting rod 2 to move backwards so that a space is formed between the bottom of the concave shovel portion 11 and the pass hole 131 of the stop portion 13 for receiving falling seeds (referring to FIG. 4). Moreover, by moving the plate 3 forwards, the plate 3 exactly resists against the seeds S1 at a lower end of the stop portion 13 to move forwards and then the seeds will fall into the earth (referring to FIG. 4B). Then the hole is filled with soil so that the seeds are embedded therein.

Thereby, when the user shovels the soil, seeds can be placed in the soil accordingly. Thus the sowing shovel of the present invention can be operated easily and conveniently only by one hand.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A sowing shovel for sowing seed gradually; the sowing shovel having a body, an adjusting rod at a bottom of the body, a plate for adjusting the adjusting rod to move reciprocally; wherein the body has a concave shovel portion at a front section thereof and a handle at the rear section thereof; two sides of the concave shovel portion are inclined upwards; a center of the body is formed with a slender horizontal portion; the horizontal portion is formed with a track; two sides of the concave shovel portion are installed with embedding holes for confining a stop portion arranged across the two sides of the concave shovel portion; a bottom of the sowing shovel has a pass hole for receiving falling seeds;

the handle is hollowed; an interior of the handle has a stopping rib for confining the movement of the plate; the connection of the handle and the concave shovel portion has a penetrating hole for being inserted by the adjusting rod; an upper side of the penetrating hole has a buckling groove; after the adjusting rod and the plate are placed therein, an upper cover is located upon the buckling groove; the upper cover has a via hole at a position with respect to the stopping rib;

the adjusting rod passes through the penetrating hole at the connection of the concave shovel portion and the handle; a portion at a lower end of the adjusting rod corresponding to the track has a series of resisting blocks; an area of each buckling block is slightly smaller than the track so that the buckling block moves reciprocally in the track; and a plate is located on an upper side of the adjusting rod; a top surface of the plate slightly protrudes from a top of the via hole of the upper cover; an area of the plate is smaller than the via hole and is capable of moving reciprocally in the via hole;

wherein the plate drives the adjusting rod to move forwards and backwards between the handle and the concave shovel portion so that some seeds are placed in the concave shovel portion of the sowing shovel in advance; then the sowing shovel digs soil in the earth so that a hole is formed; then the plate is moved to drive the adjusting rod to move backwards so that a space is formed between a bottom of the concave shovel portion and the pass hole of the stop portion for receiving falling seeds.

2. The sowing shovel as claimed in claim 1, wherein the guide hole in a bottom of the stop portion at two sides of the concave shovel portion is adjustable according to sizes of seeds placed therein.

* * * * *